Patented Feb. 16, 1932

1,845,309

UNITED STATES PATENT OFFICE

CAMPBELL R. McCULLOUGH, OF ANNISTON, AND HERBERT BOOTH, OF BIRMINGHAM, ALABAMA, ASSIGNORS TO SWANN RESEARCH, INC., A CORPORATION OF ALABAMA

WETTING AND PENETRATING AGENTS

No Drawing.   Application filed November 23, 1929.   Serial No. 409,419.

Our invention relates to wetting, scouring and penetrating agents, and has for its object the provision of an effective, stable product of the character designated which shall be extremely rapid in its wetting and penetrating qualities.

A further object of our invention is to provide a wetting agent comprising sodium diphenyl monosulfonate and cresol, together with an alkaline substance for preventing separation of the components when the aqueous solutions are left standing.

A still further object of our invention is to provide a rapid stable wetting out agent having extremely rapid penetrating properties which will also serve as a disinfectant and prevent the formation of mildew when used in the textile industry, for example, in a sizing bath.

We have discovered that intimate mixtures of sodium diphenyl monosulphonate and cresol (cresylic acid) possesses remarkable wetting out properties of particular value in the textile industry. When left standing however, the aqueous solutions of the sodium diphenyl monosulfonate-mixture tend to separate into two layers which, while not particularly affecting the wetting and penetrating properties of the mixture, make it undesirable for use on textiles. We have found that this separation can be effectively prevented by the use of a soap jelly with or without the addition of an alkali, the stable mixture thus produced having considerably enhanced wetting properties as well as being in an entirely inseparable condition. The choice of the particular soap jelly is of no particular difficulty, since we have found that either vegetable or animal oil soaps may serve the purpose. The addition of free alkali to the mixture should be regulated with regard to the free alkali content of the soap.

A particular example of the method by which our improved wetting agent may be manufactured is as follows:

Three components are separately prepared, as follows:

*Component A.*—One part by weight of sodium diphenyl monosulfonate, dried and ground to pass a 100-mesh screen, is mixed with two parts by weight of cresol of a light color. To prevent lumping, the sodium diphenyl monosulfonate powder is added a little at a time to the cresol, at the same time stirring rapidly with a mechanical stirrer. The mixed paste is then passed through a paint or other fine grinding mill in order to further incorporate the ingredients.

*Component B.*—Equal parts by weight of cocoanut oil soap of good quality and water are heated together at 100° C. with stirring until a clear, thick, yellow solution is formed. The solution is then cooled to form a clear jelly.

*Component C.*—One part by weight of sodium hydroxide is dissolved in one part by weight of water to form a clear solution. The solution is then cooled.

Components A, B and C are now combined in the following fashion:

One hundred parts by weight of component A, as prepared above, are mixed with 9.6 parts by weight of component C, and the mass thoroughly mixed. Then forty parts by weight of component B are added with further mixing until the whole is uniform. When the three component parts are thus combined the resulting product is a thin paste varying in color from buff to red brown.

In the manufacture of component B, instead of the cocoanut oil soap, we have found that oleic acid, steric acid palm oil or other suitable soaps may be employed in place of the cocoanut oil soap with satisfactory results, and further that in the manufacture of component C, potassium hydroxide may be used with equally good results. Furthermore, while we have indicated a satisfactory and workable proportioning of the ingredients, we have found that these proportions may be considerably varied without seriously altering the wetting properties of the resultant product.

We have found that our improved product is particularly useful as a wetting agent for use in the textile industry, for example in increasing the rate and thoroughness of penetration of dyes when dyeing with vat colors. It is also extremely useful as a wetting agent in sizing warp in preparation for weaving and conditioning yarn before spinning. When so used we have found that it also acts as a sterilizing agent in preventing mildew in the size box. In addition to these uses we have found our improved product useful as a penetrating agent in impregnating wood and other materials with preservatives, such, for example, as in creosoting lumber.

In using our improved product, it is dissolved directly in the dye or bath with which it is to be employed, the amount used depending of course upon the use to which it is put and the rapidity of penetration desired. In no instance is any great quantity required. For example, in solublizing dye stuffs, we have found that from 1% to 2% of the weight of goods to be dyed gives excellent results.

What we claim is:

1. An agent of the character described comprising sodium diphenyl monosulfonate and cresol.

2. An agent of the character described comprising sodium diphenyl monosulfonate intimately mixed with cresol in the proportion of one part of sodium diphenyl monosulfonate by weight to two parts of cresol.

3. An agent of the character described comprising sodium diphenyl monosulfonate intimately mixed with cresol, and an emulsifying agent.

4. An agent of the character described comprising sodium diphenyl monosulfonate intimately mixed with cresol, and an alkaline emulsifying gent.

5. An agent of the character described in the form of a paste composed of sodium diphenyl monosulfonate, cresol and an emulsifying agent.

6. An agent of the character described in the form of a paste composed of sodium diphenyl monosulfonate, cresol and a soap jelly.

7. An agent of the character described in the form of a paste composed of sodium diphenyl monosulfonate, cresol, a soap jelly, and an alkaline hydroxide.

8. A wetting agent consisting of a mixture of sodium diphenyl monosulfonate, cresol and a soap.

9. A wetting agent consisting of a mixture of sodium diphenyl monosulfonate, cresol, soap and an alkaline hydroxide.

10. A wetting agent consisting of a mixture of sodium monosulfonate, cresol, soap and sodium hydroxide.

11. A wetting-out agent consisting of an intimate mixture of substantially 100 parts of component A with substantially 9.6 parts of component C and substantially 40 parts of component B, component A consisting of an intimate mixture of one part of sodium diphenyl monosulfonate with two parts by weight of cresol; component C consisting of a jelly containing equal amounts of cocoanut oil soap and water; component B consisting of an approximately 50 percent solution of sodium hydroxide in water.

12. The process of producing an agent of the character described which comprises slowly adding comminuted sodium diphenyl monosulfonate to cresol until the proportion of one part sodium diphenyl monosulfonate to two parts by weight of cresol is attained while agitating the mixture.

13. The process of producing an agent of the character described which comprises slowly adding comminuted sodium diphenyl monosulfonate to cresol until the preparation of one part sodium diphenyl monosulfonate to two parts by weight of cresol is attained while agitating the mixture, and adding thereto 9.6 parts by weight of a 50% solution of sodium hydroxide.

14. The process of producing an agent of the character described which comprises slowly adding comminuted sodium diphenyl monosulfonate to cresol until the proportion of one part sodium diphenyl monosulfonate to two parts by weight of cresol is attained while agitating the mixture, adding thereto 9.6 parts by weight of a 50% solution of sodium hydroxide, 40 parts by weight of soap jelly, and mechanically mixing until a thin paste is obtained.

In testimony whereof we affix our signatures.

CAMPBELL R. McCULLOUGH.
HERBERT BOOTH.